United States Patent [19]

Oude Elberink et al.

[11] 4,314,247
[45] Feb. 2, 1982

[54] DEGARBLER FOR AN INTERROGATOR-TRANSPONDER SYSTEM

[75] Inventors: Bernard H. M. Oude Elberink, Oldenzaal; Gerardus J. M. Damhuis, Rossum; Han Alink, Hengevelde, all of Netherlands

[73] Assignee: Hollandse Signaalapparaten B.V., New York, N.Y.

[21] Appl. No.: 30,041

[22] Filed: Apr. 13, 1979

[30] Foreign Application Priority Data

Apr. 26, 1978 [NL] Netherlands ................. 7804440

[51] Int. Cl.³ ............................................. G01S 13/78
[52] U.S. Cl. ............................................. 343/6.5 LC
[58] Field of Search ................................. 343/6.5 LC

[56] References Cited

U.S. PATENT DOCUMENTS

| | | | |
|---|---|---|---|
| 3,188,629 | 6/1965 | Humpherys | 343/6.5 R |
| 3,466,614 | 9/1969 | Mikaloff | 343/6.5 LC X |
| 3,732,563 | 5/1973 | Nelson | 343/6.5 LC |
| 3,801,980 | 4/1974 | Danton et al. | 343/6.5 LC |
| 4,167,006 | 9/1979 | Funatsu et al. | 343/6.5 LC |
| 4,180,815 | 12/1979 | Hill | 343/6.5 R |

*Primary Examiner*—T. H. Tubbesing
*Attorney, Agent, or Firm*—Thomas A. Briody; David R. Treacy; Robert J. Kraus

[57] ABSTRACT

A degarbler for an interrogator-transponder system with a reply code consisting of two framing pulses which enclose code pulses representative of a reply. The degarbler comprises in combination: a shift memory storing the replay code;

framing-pulse detectors connected to the memory, whereby in case an edge of a framing pulse falls within gates generated with the other framing pulse, a framing-pulse detector delivers a signal indicating the presence of a reply code in the memory;

a detection triggering unit; and code pulse detectors, whereby the triggering unit ensures that, in the presence of a first reply code or a reply code overlapping a preceding reply code, the appropriate code pulse detector generates a series of gates to pass through the data from the memory to a register forming part of this code pulse detector.

7 Claims, 8 Drawing Figures

DEGARBLER FOR AN INTERROGATOR-TRANSPONDER SYSTEM

The invention relates to a degarbler for use in an interrogator-transponder system with a reply code which consists of first and second framing pulses, separated by a fixed time interval, and between said two framing pulses a reply, representative of the presence or absence of code pulses in defined time slots.

In an interrogator-transponder system a secondary surveillance radar transmits an interrogating code, upon which a transponder on board an aircraft gives a reply. The interrogating code is transmitted via a separate antenna coupled to the antenna of a primary surveillance radar, such that only aircraft in the beam of the former antenna are able to give a reply. The interrogation may occur in various modes; the transponder responds to the relevant mode and sends a reply. The antenna of the transponder is omnidirectional, the reply code is therefore transmitted in all directions.

In an environment where several transponders are located within the receiving range of an interrogator, such as at an airport, the reply codes may be garbled through a high reply density. It is therefore possible that simultaneously or almost simultaneously with a reply code asynchronous or synchronous replies are received, in the latter case for instance with aircraft situated at different altitudes but otherwise at the same position. In both cases the reply codes may fully or partially overlap each other. Further it is possible that one or several framing and/or code pulses are garbled through the presence of interference pulses.

The present invention has therefore for its object to provide a degarbler which is capable of separately detecting reply codes overlapping each other and of detecting reply codes of which certain pulses are garbled.

According to the invention, the degarbler thereto comprises in combination:
  a shift memory for the storage of the reply code;
  a first and a second framing-pulse detector, which two detectors are connected to output taps on the shift memory, which output taps show a time difference greater than said fixed time interval whereby, if at least one of the edges of the first framing pulse falls within gates generated with the second framing pulse, the first framing-pulse detector delivers a signal indicating the presence of a first reply code in the shift memory and whereby, in case at least one of the edges of the second framing pulse falls within gates generated with the first framing pulse, the second framing-pulse detector delivers a signal indicating the presence of a reply code overlapping a preceding reply code in the shift memory;
  a detection triggering unit; and
  a first and a second code pulse detector, whereby the detection triggering unit, in response to at least the signals delivered by the framing-pulse detectors, ensures that in the presence of a first reply code a series of gates is generated in the first code pulse detector, to pass through the data from the shift memory to a register forming part of the first code pulse detector, and that in the presence of reply codes overlapping each other a series of gates is generated in the relative code pulse detector to pass through the data from the shift memory to a register forming part of the relevant code pulse detector.

The invention will not be described with reference to the accompanying figures, of which.

Figure 1:
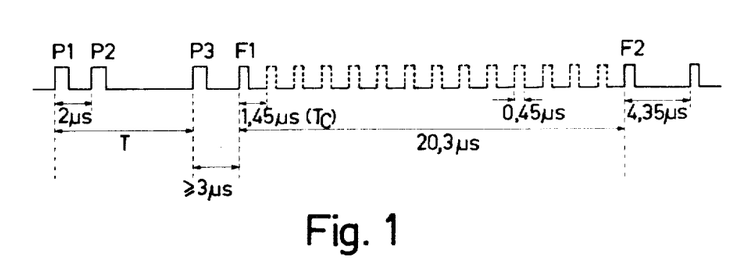
FIG. 1 is a diagram illustrating the interrogating code and the reply code received by a secondary surveillance radar.

The signal in FIG. 1 consists of an interrogating code and a reply code. The interrogating code transmitted by the interrogator and directly applied to the receiver of the secondary surveillance radar as well, is produced by pulses P1-P3. The nature of the required information is thereby contained in the interrogating mode determined by the interval T between pulses P1 and P3, which are the so-called mode pulses transmitted by the secondary surveillance radar in a certain direction via the antenna. Pulse P2, transmitted omnidirectionally, has no mode function, but is used for side-lobe suppression. The transponder gives a reply a fixed time after reception of pulse P3. The reply code consists of the framing pulses F1 and F2, separated by a fixed time interval, and between these two framing pulses a reply, representative of the presence or absence of code pulses in defined time slots. With special replies, the frame pulse F2 is followed by one or more pulses. The entire system of the interrogating and reply code is laid down in Annex 10, Volume 1 of the International Civil Aviation Organisation (ICAO); a similar system is laid down for military air traffic (Identification Friend or Foe).

Figure 2:
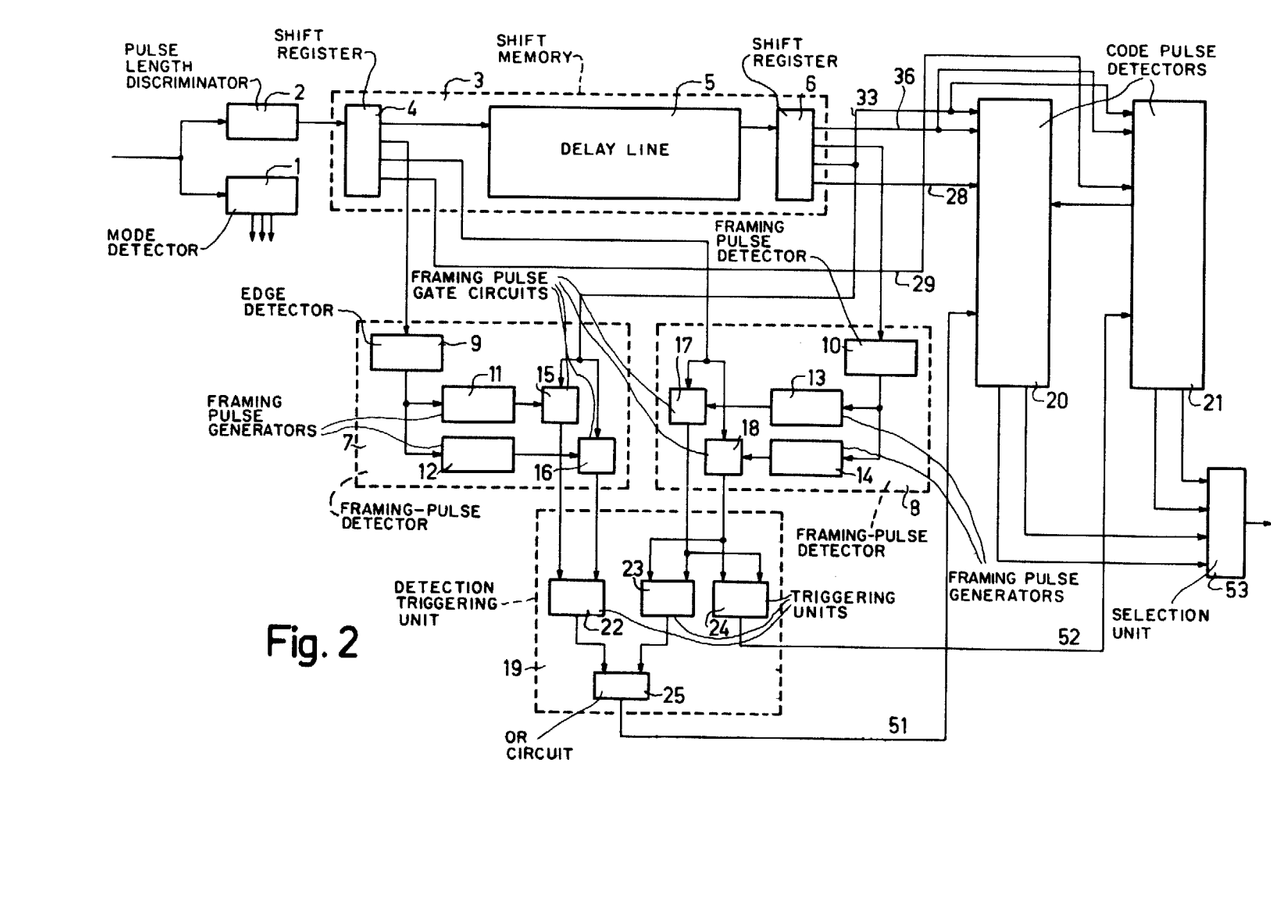
FIG. 2 is a block diagram illustrating a degarbler according to the invention.
Figure 3A:
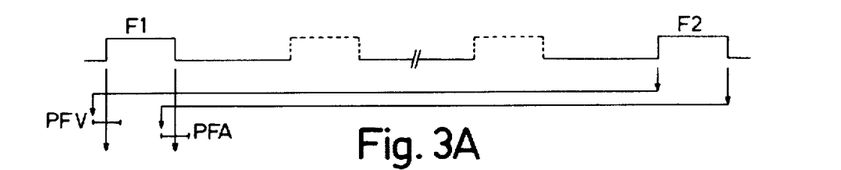
FIGS. 3A, 3B and 4 are diagrams useful in explaining the operation of the framing-pulse detectors.
Figure 3B:
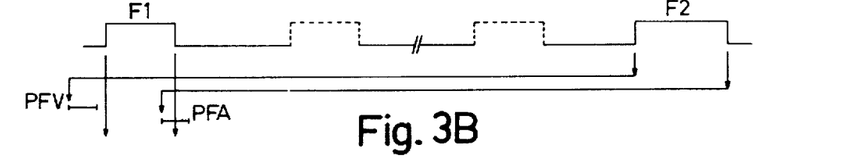
Figure 4:
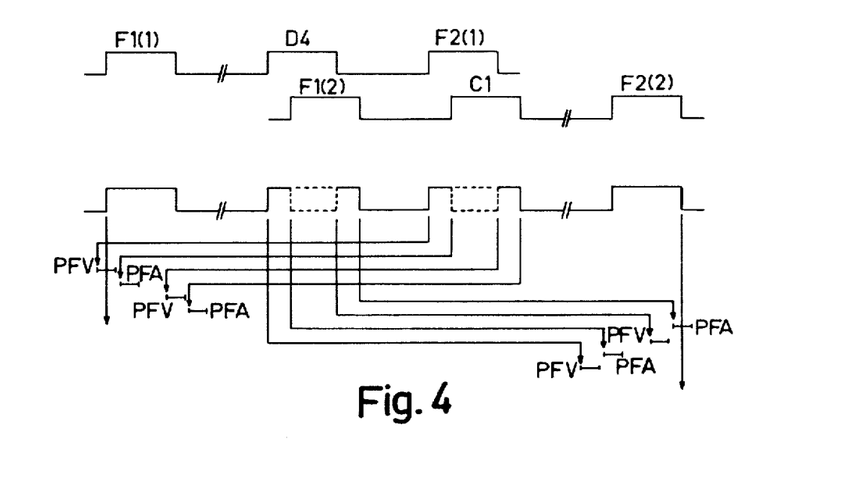

In the block diagram of the degarbler in FIG. 2 the received signal is applied to a mode detector 1 and a pulse length discriminator 2. The mode detector 1 responds to the interrogating code and, depending on the time T which assumes only certain discrete values, replies with three mode bits indicative of the nature of the interrogation. The design of this mode detector and further processing of the mode bits is immaterial to the present invention. The pulse length discriminator 2 responds to the length of framing and code pulses; pulses of too short a length will not be passed through. The pulse train passed through is subsequently applied to a shift memory 3, consisting of a first shift register 4, a delay line 5 and a second shift register 6. The total delay time of the shift memory 3 is such that it is able to accommodate the complete reply code with the necessary tolerance; for example, with a reply code of 20.75 $\mu$sec length a total delay time of 21 $\mu$sec is sufficient. A first and a second framing-pulse detector, 7 and 8, are connected to the shift memory 3. In the block diagram of FIG. 2 each of these framing-pulse detectors is coupled to taps of shift registers 4 and 6, which taps are so spaced in time that they show a time difference which is greater than the fixed time interval of 20.3 $\mu$sec separating the framing pulses F1 and F2. The reason for selecting these taps will be explained below. Each of the framing-pulse detectors 7 and 8 comprises an edge detector 9 and 10, two framing-pulse generators 11, 12 and 13, 14 and two framing-pulse gate circuits 15, 16 and 17, 18. The presence of the leading and the trailing edges of a pulse at the connected output of shift register 4 is established by edge detector 9, where the leading edge controls the framing-pulse gate generator 11 and the trailing edge the framing-pulse generator 12. During a time τ the framing-pulse gate generators 11 and 12 hold the framing-pulse gate circuits 15, 16 in a state in which these circuits monitor the presence or absence of a leading and a trailing edge of pulses at the connected output of shift register 6. That is, the frame detector 7 establishes whether one of the edges of framing pulse F1 falls within a gate generated with framing pulse F2. Similarly, the framing-pulse detector 8 establishes whether one of the edges of framing pulse F2 falls within a gate generated with framing pulse F1. The time difference between the taps of shift registers 4 and 6, to which the framing-pulse detectors 7 and 8 are connected, corresponds with the distance between the corresponding edges of framing pulses F1 and F2 increased by half the gate width, being 20.3 μsec + Δτ in the case in question. A greater time difference may of course be selected if a corresponding delay be incorporated in the framing-pulse gate generators. Further, the gate width τ may be set at choice. The operation of the framing-pulse detectors described above is illustrated in FIGS. 3A and 3B. FIG. 3A shows a reply code of which the two framing pulses are received in an ungarbled condition. Proceeding from the leading and the trailing edges of framing pulse F2, gates PFV and PFA are generated, the edges of framing pulse F1 falling within these gates. FIG. 3B illustrates a reply code of which the framing pulse F2 is garbled, such that the leading edge appears too early. Starting from the leading and the trailing edges of framing pulse F2, again the gates PFV and PFA are generated. However, only the trailing edge of framing pulse F1 falls within the corresponding gate PFA. In the first case, the frame of the reply code is detected on both the leading and the trailing edges of the framing pulses. As will appear from the following, the code pulses may be detected on the basis of a so-called leading edge frame detection, as well as on the basis of a so-called trailing edge frame detection. In the second case, code pulses can be detected exclusively on the basis of trailing edge frame detection. It will be clear that, if the trailing edge of the framing pulse illustrated in FIG. 3B were delayed, the code pulses can be detected only on the basis of leading edge frame detection. In FIG. 3B it is assumed that framing pulse F1 is received in an ungarbled condition and framing pulse F2 in a garbled condition. This could be the case if two overlapping replies are received. The first reply will then correspond with the reply code of FIG. 3B, while the first framing pulse of the second reply overlapping the first will be received in a garbled condition and the second framing pulse in an ungarbled condition. This situation is illustrated in FIG. 4. Of the first reply the code pulse D4 is indicated, of the second reply the code pulse C1. The figure shows how through pulse suppression and/or pulse widening a pulse train is received with two garbled pulses including the second framing pulse of the first reply F2(1) and the first framing pulse of the second reply F1(2). Proceeding from the garbled framing pulse F2(1), here only the leading edge of the framing pulse F1(1) falls within the gate PFV generated for that purpose. The trailing edge of the framing pulse F1(1) would fall within the other gate intended for a leading edge, if this were to be passed through, but this is not applicable. No edge at all falls within the PFA gates. The leading edge of the framing pulse F1(1) is detected in the framing pulse detector 7, enabling the detection of the code pulses on the basis of leading edge frame detection. In an analogous way, the trailing edge of the framing pulse F2(2) is detected in the framing pulse detector 8, enabling the detection of the code pulses on the basis of trailing edge frame detection. With overlapping reply codes it should be possible to operate two framing pulse detectors simultaneously. As soon as the frame of the first reply has been detected, i.e. as soon as a leading or a trailing edge of the framing pulse F1(1) falls within one of the gates generated through the garbled framing pulse F2(1), the second framing pulse detector 8 is released.

The degarbler illustrated in FIG. 2 further comprises a detection triggering unit 9 and a first and a second code pulse detector 20 and 21. As soon as the frame of a first reply code has been detected, the detection triggering unit 19 ensures that the code pulses of this first reply code are detected in the first code pulse detector 20; on the subsequent detection of the frame of a second reply code overlapping the first reply code, the detection triggering unit 19 provides for the detection of the code pulses of the second reply code in the second code pulse detector 21. If thereafter the frame of a third reply code overlapping the second reply code is detected, the first code pulse detector 21 is again activated. The latter however does not occur if the third reply code overlaps the first reply code as well, as the first code pulse detector should be released to be able to process the third reply code. In the case of overlapping of the first reply code by the third one, the third reply code overwrites the second one, and the second code pulse detector processes the third reply code. The degarbler is therefore suitable for an unlimited series of reply codes overlapping each other. In such a case the code pulse detectors 20 and 21 are in principle active alternately, that is if overwriting of reply codes be left out of consideration. This is not the case with the framing-pulse detectors, as was already apparent from the foregoing. The first framing pulse detector is active with the first reply code, i.e. a reply code with a framing pulse F1(1) in principle ungarbled, while the second framing pulse detector is active with all following reply codes each of which overlapping the preceding codes. The reason thereof is that the second reply code is considered to comprise an ungarbled framing pulse F2(2). With the occurrence of a third reply code overlapping the second one this appears to be false however; in such a case it is assumed that the third reply code comprises an ungarbled framing pulse F2(3). The detection triggering unit 19 consists of a first, a second and a third triggering unit 22, 23 and 24, and an OR circuit 25. On the reception of a first reply the triggering unit 22, controlled by the framing pulse detector 7, delivers via the OR circuit 25 the signals activating the code pulse detector 20. On the reception of a reply overlapping only each preceding reply the triggering units 23 and 24, controlled by the framing pulse detector 8, alternately deliver the signals which activate the code pulse detectors 20 and 21 alternately. The signal supplied by triggering unit 23 is of course applied to the code pulse detector 20 via the OR circuit 25. With the reception of a reply overlapping several preceding replies, the reply last received should overwrite the last preceding reply, and the code pulse detector which was processing this last preceding reply is re-activated.

Figure 5:
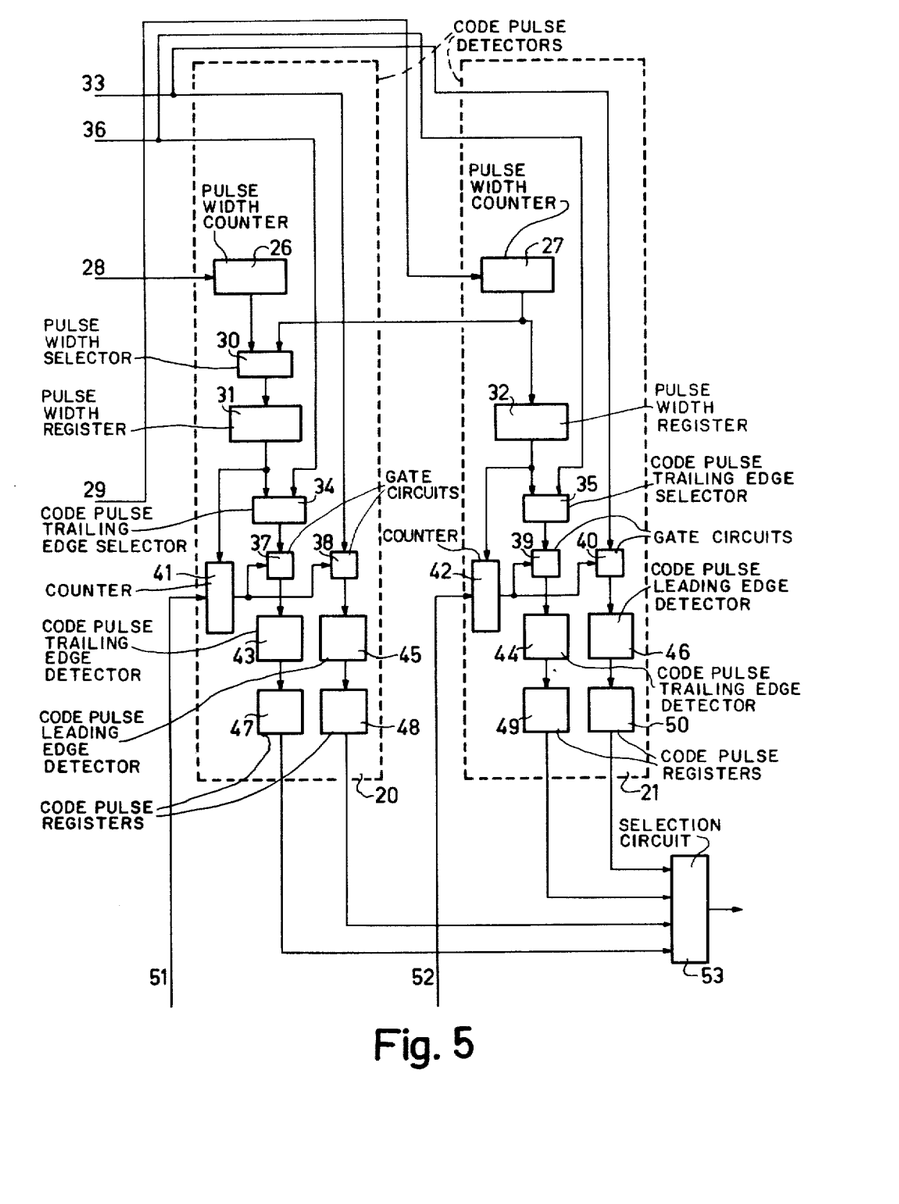
FIGS. 5 and 6 are block diagrams illustrating two embodiments of a first and a second code pulse detector.

FIG. 5 illustrates an embodiment of the first and the second code pulse detectors. Each of the code pulse detectors 20 and 21 is provided with a pulse width counter 26 and 27 respectively. These counters are coupled to the shift registers 6 and 4 respectively via lines 28 and 29. The code pulse detector 20 comprises a pulse width selector 30 connected to the two pulse width counters, while the two code pulse detectors each contain a pulse width register 31 and 32. The pulse width counter 26 is triggered as soon as the leading edge of a first pulse, i.e. the first framing pulse of a first reply F1(1) appears at the respective output of the shift register 6. The next trailing edge at this output stops the pulse width counter. The pulse width F1(1) thus measured is transferred into the pulse width register 31 via the pulse width selector 30. As soon as a second reply overlapping the first reply is detected, the pulse width counter 27 determines in a similar way the width of the second framing pulse of the second reply, the F2(2) pulse, which is subsequently transferred into the pulse width register 32. On the other hand, with a third reply overlapping only the second reply the pulse width F2(3) determined by the pulse width counter 27 is transferred into the pulse width register 31 via the pulse width selector 30. For a series of replies overlapping each other in pairs, the width of the framing pulses F1(1), F2(2), F2(3), F2(4), . . . , is written alternately into the pulse width registers 31 and 32, as in such a situation the code pulse detectors 20 and 21 have to be activated alternately. The pulse width selector 30 is thereby controlled by a signal from detection triggering unit 19; this signal is indicative of the code pulse detector to be activated.

The leading edges of the code pulses to be read out of the shift register 6 are applied to the two code pulse detectors 20 and 21 via line 33. The output tap of the shift register 6 via which the trailing edges of these code pulses are read out is that which shows a time difference corresponding with the measured framing pulse width with respect to the output tap via which the leading edges are read out. That is, a certain output of the shift register is selected on the basis of the measured framing pulse width. As to the selected output, the leading and the trailing edge of the relevant code pulses pass simultaneously through line 33 and through the line connected to the selected output provided the pulse width of the code pulses corresponds with that of the framing pulse. Each of the code pulse detectors is therefore provided with a code pulse trailing edge selector 34 and 35 respectively. These selectors are used to connect a series of output taps of the shift register 6 through line 36, while with the signal delivered by the pulse width registers 31 and 32 one of these output taps is connected to the output of the codepulse trailing edge selector 34 and 35 respectively.

Each of the two code pulse detectors further comprise two gate circuits 37, 38 and 39, 40, a counter 41 and 42, a code pulse trailing edge detector 43 and 44, a code pulse leading edge detector 45 and 46, and two code pulse registers 47, 48 and 49, 50.

Figure 7:
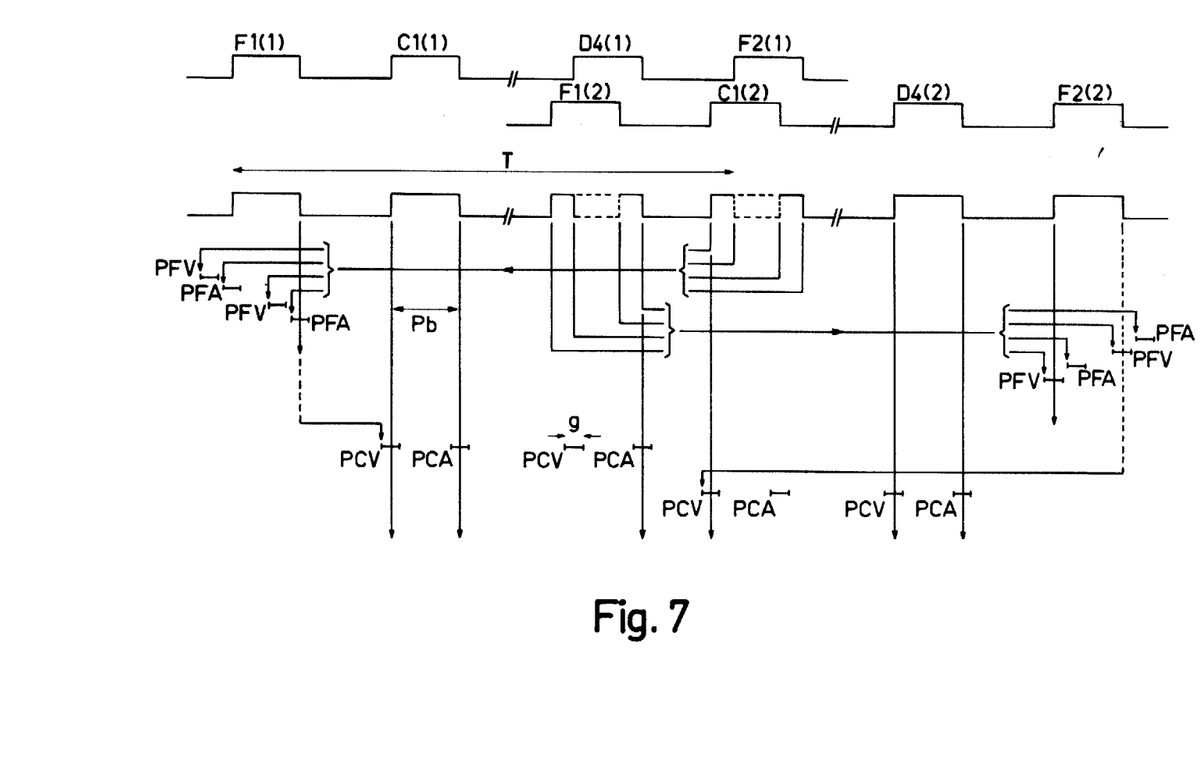
FIG. 7 is a diagram useful in explaining the operation of the code pulse detectors.

A signal supplied by the detection triggering unit 19 via line 51 releases the counter 41, which starts at the instant the trailing edge of the first framing pulse of the first reply is detected. Similarly, a signal supplied by the detection triggering unit 19 via line 52 releases the counter 42, which starts at the instant the trailing edge of the second framing pulse of a second reply is detected. It is hereby assumed that only two overlapping replies are present. In general, the presence of the trailing edge of the ungarbled or presumably ungarbled framing pulse is determinative for starting one of the two counters. Since the further operation of the code pulse detectors is identical for both, only the operation of the code pulse detector 20 will be described. The counter 41 indicates the times at which the gate circuits 37 and 38 are open for a given period g. As the codepulse leading and trailing edges appear simultaneously, if at least the width of the code pulses corresponds with that of the ungarbled framing pulse, the gate circuits 37 and 38 must be opened simultaneously, each time after the expiration of the code pulse period $T_C$ indicated in FIG. 1. As already stated, the counter 41 is started on the trailing edge of the ungarbled framing pulse. The counter must therefore be preset to a value which determines the position of the first gate to be generated with respect to the above-mentioned trailing edge and which is dependent upon the magnitude of the measured framing pulse width pb supplied to counter 41 by pulse width register 31 and upon the width of the gates g to be generated. Further, this preset value differs for the cases of starting on the trailing edge of F1(1) and on the trailing edge of F2(2), F2(3), F2(4), . . . The diagram of FIG. 7 shows the position of the generated gates on the basis of two overlapping replies. The code pulses C1 and D4 of the two replies are indicated. In accordance with the description given with reference to FIG. 4, the leading and trailing edge gates PFV and PFA of the framing pulse are illustrated; it should be noted that the presence of a first reply is established on the basis of framing pulse trailing edge detection and a second reply on the basis of framing pulse leading edge detection. The position of the code pulse leading and trailing edge gates PCV and PCA generated on the basis of the trailing edge of F1(1) and F2(2) respectively, illustrates that a code pulse detection for the first reply gives the correct result through the PCA gates and a code pulse detection for the second reply through the PCV gates; for the leading edge of the garbled D4(1) pulse is not passed through the relevant gate, as is the case for the trailing edge of the garbled C1(2) pulse.

The code pulse leading edges passed through gate circuit 38 are detected in the code pulse leading edge detector 45 and subsequently stored in the code pulse register 48. Similarly, the code pulse trailing edges passed through the gate circuit 37 are detected in the code pulse trailing edge detector 43 and stored in the code pulse register 47. Since the code pulses may be garbled, the contents of the two registers will not always be equal. Criteria should be available to establish the code pulse register which is best representative of the detected reply code. Since is it further possible that the two code pulse detectors 20 and 21 are active simultaneously, namely in the case of overlapping replies, and that therefore code pulse trailing edges and code pulse leading edges are stored in code pulse registers 49 and 50 respectively, it must also be determined which of the code pulse detectors is representative of a reply code in one of the registers. A selection circuit 53 is thereto connected to registers 47, 48, 49 and 50; this selection circuit contains the criteria used to pass through the contents of one of the above registers for further processing. That is, the selection circuit 53 ultimately delivers the desired reply code.

The control of the selection circuit 53 is discussed below.

Figure 6:
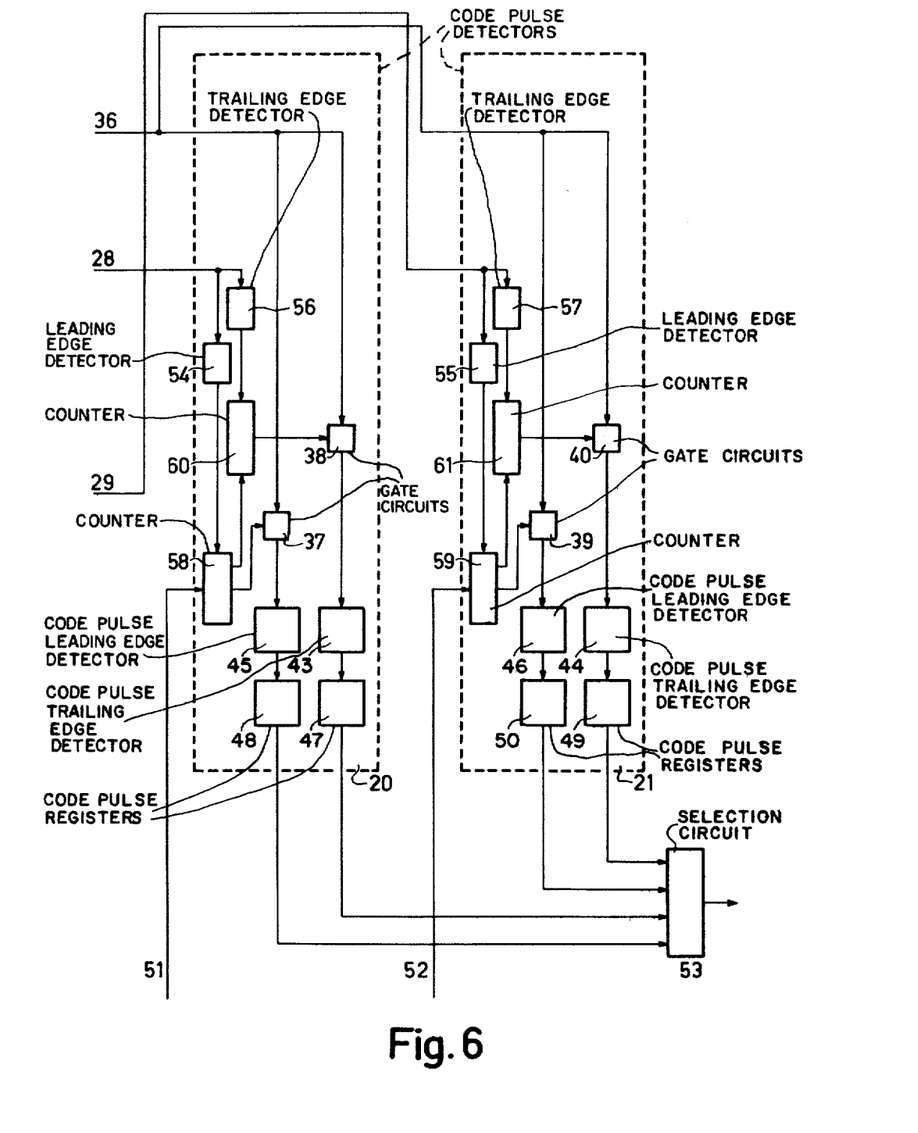

FIG. 6 illustrates a second embodiment of the first and the second code pulse detectors. Each of the code pulse detectors 20 and 21 is provided with a leading edge detector 54 and 55, a trailing edge detector 56 and 57, a first counter 58 and 59, and a second counter 60 and 61; the remaining assembly components of the two code pulse detectors are identical to the corresponding components of the code pulse detectors illustrated in FIG. 5. Since the two code pulse detectors 20 and 21 are fully identical, only the operation of the code pulse detector 20 will be described.

A signal supplied by the detection triggering unit 19 via line 51 releases the counter 58, which starts at the instant the leading edge of the first framing pulse of the first reply is detected in the leading edge detector 54 connected to the shift register 6 via line 28. After the expiration of each code pulse period $T_C$ the counter 58 opens the gate circuit 37 for a period g, with the proviso that this gate be opened the first time for a period $T_C-\frac{1}{2}$ g after the leading edge of the framing pulse. The gate circuit 37 then passes through the ungarbled leading edges of the code pulses, which edges are detected and transferred into the code pulse register 47, as in the case of the embodiment of FIG. 5. On the triggering of counter 58, counter 60 is released; the latter counter then starts at the instant the trailing edge of the first framing pulse of a first reply is detected in the trailing edge detector 56 connected to the shift register 6 via line 28. After the expiration of each code pulse period $T_C$ the counter 60 opens the gate circuit 38 for a period g, providing that this gate be opened the first time for a period $T_C-\frac{1}{2}$ g after the trailing edge of the framing pulse. The gate circuit 38 then passes through the ungarbled trailing edges of the code pulses, which edges are detected and shifted into the code pulse register 48, as in the case of the embodiment of FIG. 5. Hence, the leading and trailing edges of the code pulses are not detected simultaneously, as in the embodiment of FIG. 5, but with an interval corresponding with the framing pulse width. As described with reference to FIG. 5, a selection circuit 53 is connected to registers 47, 48, 49 and 50; this selection circuit contains the criteria used to pass through the contents of one of the above registers and hence the desired reply code for further processing.

These criteria are connected with the possible garbled situations of the framing pulses and the code pulses as well as with the time schedule of operation of the code detectors 20 and 21. The code pulse leading and trailing edge detectors determine whether with the presence of a code pulse a leading or a trailing edge falls within the generated gates and whether in the absence of a code pulse an uninterrupted "0" level falls within the gates. All other situations are regarded as garble. In case of a garble situation, a flip-flop incorporated for this purpose in the code pulse leading and trailing edge detectors is set. The flip-flop may be set in both, in one or in none of the detectors 43, 45 or 44, 46. If the flip-flop of detector 45 or 46 is set, the leading edge of at least one code pulse is garbled: CGAV=1; if the flip-flop of detector 43 or 44 is set, the trailing edge of at least one code pulse is garbled: CGAA=1. As already stated the framing pulse detector 7 establishes whether one of the edges of framing pulse F1 falls within a gate generated with framing pulse F2. Similarly, the framing pulse detector 8 establishes whether one of the edges of framing pulse F2 falls within a gate generated with framing pulses F1. So, the framing pulse detectors 7 and 8 generate signals FRGAV and FRGAA, indicating whether the leading or trailing edges of the graming pulses are garbled or not. If FRGAV=1 the leading edge of a framing pulse is garbled; if FRGAA=1 the trailing edge of a framing pulse is garbled.

A first selection circuit signal determining which of the registers 47–50 is connected with the output is:

$$SEL1 = FRGAV + FRGAA \cdot CGAV.$$

If on the completion of the code pulse detection process in the detectors 43 and 45 or 44 and 46 none of the two code pulse trains is observed to be garbled, or if only the code pulse leading edges are detected to be ungarbled: CGAV=0; if also the leading edge of the framing pulses is ungarbled, i.e. FRGAV=0, then SEL1=0. In the latter case the selection circuit 53 may pass through the leading edge code, i.e. the contents of the registers 48 or 50. If the leading edge of the framing pulses is ungarbled: FRGAV=0 and the trailing edge of the framing pulses is garbled: FRGAA=1, then SEL1=0 and the selection circuit 53 may again pass the leading edge code, irrespective of possible code pulse garbling, as a garbled reply code can still contain usable information. A garbled reply code is labelled "garbled". If SEL1=1 the selection circuit 53 may pass the trailing edge code, i.e. the contents of register 47 or 49.

Furthermore, it must be established whether the contents of one of the registers of the code pulse detector 20 or that of one of the registers of code pulse detector 21 must be applied.

The selection circuit thereto makes a record of the time when the code pulse detection of the first and the subsequent reply codes overlapping each preceding reply code has ended and generates a second selection signal SEL2. Both selection signals SEL1 and SEL2 control the selection process in circuit 53.

We claim:

1. Degarbler for use in an interrogator-transponder system with a reply code which consists of first and second framing pulses, separated by a fixed time interval, and between said two framing pulses a reply, representative of the presence or absence of code pulses in defined time slots, the degarbler comprising in combination:

a shift memory for the storage of the reply code;

a first and a second framing-pulse detector, which two detectors are connected to output taps of the shift memory, which output taps show a time difference greater that said fixed time interval, said first and second framing-pulse detectors comprising means for generating gate pulses responsive to leading and trailing edges of said second and first framing pulses, respectively, said first framing pulse detector responsive to a condition wherein at least one of the edges of the first framing pulse falls within gates generated with the second framing pulse for producing a signal indicating the presence of a first reply code in the shift memory, said second framing pulse detector responsive to a condition wherein at least one of the edges of the second framing pulse falls within gates generated with the first framing pulse for providing a signal indicating the presence of a reply code overlapping a preceding reply code in the shift memory;

a detection triggering unit; and a first and second code pulse detector, the detection triggering unit comprising means operative in response to at least the signals delivered by the framing-pulse detectors for producing in the presence of a first reply code a series of gates in the first code pulse detector, to pass through the data from the shift memory to a register forming part of the first code pulse detector, and for producing in the presence of reply codes overlapping each other a series of gates in the relative code pulse detector to pass through the data from the shift memory to a register forming part of the relevant code pulse detector.

2. Degarbler for use in an interrogator-transponder system as claimed in claim 1, wherein each of the framing-pulse detectors comprises an edge detector which, in response to applied pulses from the shift register, delivers signals representing the leading and the trailing edges of said pulses, and further comprises two framing-pulse gate generators and a framing-pulse gate circuit controlled by each of said framing-pulse gate generators, whereby said framing-pulse gate generators, in response to the signals representing the leading and the trailing edges of the applied pulses, ensure that the framing-pulse gate circuits are opened at such times that, if the edge detector responds to a first framing pulse, the leading and the trailing edges of the second framing pulse from the shift memory can pass through said gate circuits with the proviso that the framing pulses were ungarbled.

3. Degarbler for use in an interrogator-transponder system as claimed in claim 1, wherein each of the code pulse detectors comprises two gate circuits, which are opened at such times that the leading and the trailing edges of code pulses from the shift memory can be passed through, with the proviso that the code pulses were ungarbled, and further comprises a code pulse leading and a trailing edge detector for detecting the code pulse leading and trailing edges having passed through the gate circuits.

4. Degarbler for use in an interrogator-transponder system as claimed in claim 3, wherein each of the code pulse detectors comprises a pulse width counter which, in response to the leading and the trailing edges of the framing pulses, selects the outputs of the shift register of which the shifting time corresponds with the measured framing pulse width and via which the code pulse leading and trailing edges are read out of the shift memory.

5. Degarbler for use in an interrogator-transponder system as claimed in claim 4, wherein each of the code pulse detectors comprises a counter which, in response to a signal supplied by the detection triggering unit, to the trailing edge of the first framing pulse and to the measured pulse width, controls the gate circuits in the relevant code pulse detector to be able to pass through the leading and the trailing edges of the code pulses simultaneously.

6. Degarbler for use in an interrogator-transponder system as claimed in claim 3, wherein each of the code pulse detectors comprises a first and a second counter, of which the first counter, in response to a signal supplied by the detection triggering unit and to the leading edge of the first framing pulse, controls the gate circuit in the relevant code pulse detector to pass through the leading edges of the code pulses, and of which the second counter, in response to a signal from the first counter and to the trailing edge of the first framing pulse, controls the gate circuit in the relevant code pulse detector to pass through the trailing edges of the code pulses.

7. Degarbler for use in an interrogator-transponder system as claimed in claim 3, wherein a selection circuit, connected to the code pulse registers in the two code pulse detectors, is incorporated, which selection circuit, depending on the code pulse detector having processed the relevant reply code and depending on the garbled state of the framing and/or code pulses, regards the contents of one of the code pulse registers as the desired reply code.

* * * * *